United States Patent [19]

Tamamura

[11] Patent Number: 5,724,623
[45] Date of Patent: Mar. 3, 1998

[54] CAMERA USING A FILM WITH A MAGNETIC MEMORY PORTION

[75] Inventor: Hideo Tamamura, Yokohama, Japan

[73] Assignee: Canon Kabushiki Kaisha, Tokyo, Japan

[21] Appl. No.: 473,956

[22] Filed: Jun. 7, 1995

Related U.S. Application Data

[63] Continuation of Ser. No. 171,779, Dec. 22, 1993, abandoned, which is a continuation of Ser. No. 865,240, Apr. 8, 1992, abandoned.

[30] Foreign Application Priority Data

Apr. 26, 1991 [JP] Japan .................................. 3-122996

[51] Int. Cl.$^6$ .................................................. G03B 17/24
[52] U.S. Cl. ........................................... 396/319; 396/406
[58] Field of Search ............................ 354/21, 105, 106, 354/173.1, 173.11, 212, 213, 214, 215; 396/319, 387, 395–400, 406, 407, 409, 410, 413

[56] References Cited

U.S. PATENT DOCUMENTS

| | | | |
|---|---|---|---|
| 4,417,793 | 11/1983 | Oyokota et al. | 354/21 |
| 4,864,322 | 9/1989 | Yamamoto et al. | 343/903 |
| 5,150,143 | 9/1992 | Ohno et al. | 354/106 X |

FOREIGN PATENT DOCUMENTS

| | | |
|---|---|---|
| 57-139726 | 8/1982 | Japan . |
| WO90-04204 | 10/1989 | WIPO . |
| WO90-04254 | 10/1989 | WIPO . |

*Primary Examiner*—Howard B. Blankenship
*Attorney, Agent, or Firm*—Fitzpatrick, Cella, Harper & Scinto

[57] ABSTRACT

A camera, which uses a film with a magnetic memory portion, or a control apparatus for such a camera, includes a first detection sensor for detecting a perforation of the film, arranged at a first position where the perforation of the film passes, a second detection sensor for detecting the perforation of the film, arranged at a second position where the perforation of the film passes and which is shifted from the first position in the direction in which the film is transported, and a control circuit for determining a starting time, a first stopping time, a writing frequency of writing information to the magnetic memory portion of the film, and a second stopping time to stop transporting the film, in response to the first and second detection sensors.

87 Claims, 5 Drawing Sheets

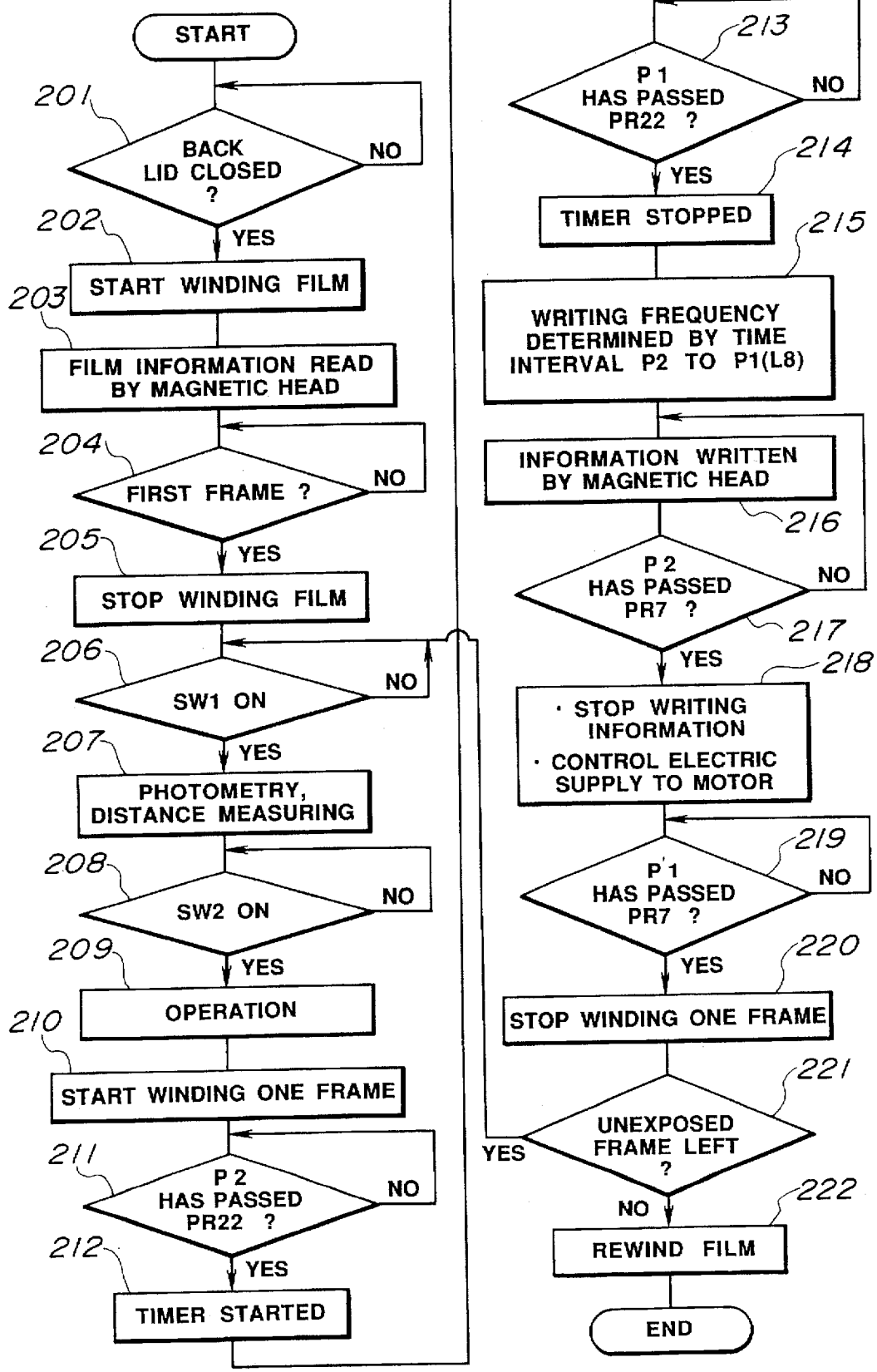

CAMERA USING A FILM WITH A MAGNETIC MEMORY PORTION

This application is a continuation of prior application Ser. No. 08/171,779 filed on Dec. 22, 1993, which is a continuation of application Ser. No. 07/865,240 filed on Apr. 8, 1992, both now abandoned.

BACKGROUND OF THE INVENTION

1. Field of the Invention

The present invention relates to a camera which uses a film with a magnetic memory portion, or a control apparatus for such a camera, and writing or reading information to or from the magnetic memory portion of the film.

2. Description of the Related Art

U.S. Pat. No. 4,864,322 relates to a type of camera in which a film having a magnetic memory portion is used and information such as a date, including year, month, and day, a shutter speed and an aperture value can be written to or, if necessary, read from this magnetic memory portion by means of a magnetic head, or information written in advance such as the ISO and the specified number of film frames is read from the magnetic memory portion by means of the magnetic head. W.O. 90-04204 discloses a detailed way to record the magnetic information, using different kinds of indices, commonly known as IDs (IDENTIFICATIONS), corresponding to different kinds of magnetic information. W.O. 90-04254 discloses that end marks are recorded after the respective magnetic information.

A camera using the film with the magnetic memory portion is proposed in U.S. patent application Ser. No. 786,884 by the applicant. This camera writes photographic information, such as, a shutter speed or an aperture value, date information, etc, to the magnetic memory portion of the film after an exposure operation. At this time, information recorded in advance on the magnetic memory portion, such as the ISO or the specified number of film frames, is eliminated. The camera does not write the information to the entire area of the magnetic memory portion, but rather, only the predetermined limited area of the magnetic memory portion corresponding to one frame of the film. That is, the original information remains on the area of the magnetic memory portion where the camera does not write the information. Therefore, if the film, which is used halfway and rewound, is loaded in the camera again, the camera transports the film in such a way as to distinguish between an exposed frame and an unexposed frame by counting the amount of the original information, for example the number of pre-recorded markers, on the magnetic memory portion of the film, to set the unexposed frame of the film at the aperture of the camera.

However, such a camera as above-described controls the stopping of a film transporting operation by means of a single photoreflector, i.e., the photoreflector detects the perforation of the film, and determines the time to start and stop writing the information to the magnetic memory portion and further determines the frequency of the writing operation, by means of an encoder when the information is written on the magnetic memory portion of the film by means of the magnetic head. Therefore, this causes the following problems.

(1) The encoder is arranged in such a manner that a roller of the encoder is in pressure contact with the film to convert a film movement into a rotation of the roller. Thus, dust enters between the roller and the film and harms the film.

(2) The roller of the encoder sometimes slips on the film. As a result, a deviation occurs between the roller and the film, and the aforementioned operations cannot be precisely controlled.

SUMMARY OF THE INVENTION

One aspect of the present invention is to provide a camera using a film with a magnetic memory portion, or a control apparatus for such a camera, which comprises first detection means for detecting a perforation of the film, arranged at a first position where the perforation of the film passes, second detection means for detecting the perforation of the film, arranged at a second position where the perforation of the film passes and which is shifted from the first position in the direction in which the film is transported, and control means for determining a starting time, a stopping time, a writing frequency of writing information to the magnetic memory portion of the film, and a stopping time the stopping of transporting the film, in response to the first and second detection means, whereby the signal generating device for controlling the writing of information to the magnetic memory portion of the film and the stopping of transporting the film, is prevented from harming the film or acting incorrectly.

Other aspects of the present invention will become apparent from the following description of the preferred embodiment of the present invention.

BRIEF DESCRIPTION OF THE DRAWINGS

FIG. 5 is a flowchart showing an operation of a control circuit shown in FIG. 3.

DETAILED DESCRIPTION OF THE PREFERRED EMBODIMENT

A preferred embodiment of the present invention will be described with reference to the accompanying drawings.

Figure 1:
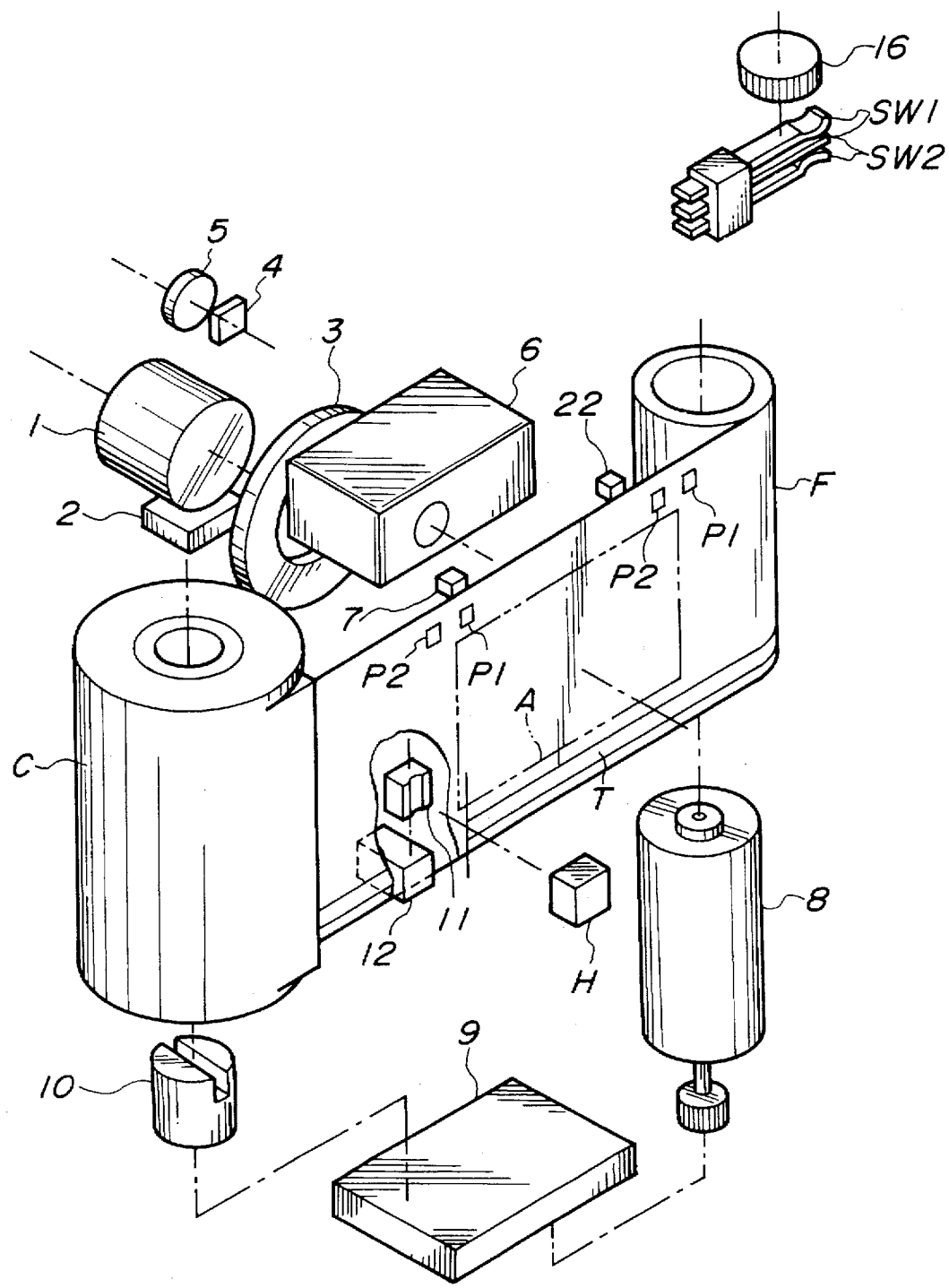
FIG. 1 is a perspective view of the internal construction of a camera in accordance with a preferred embodiment of the present invention.

FIG. 1 is a perspective view of the internal construction of a camera in accordance with the preferred embodiment of the present invention.

Referring to FIG. 1, reference numeral 1 denotes a photographic lens; 2, a lens driving block including a lens actuator 2a (see FIG. 2) for driving the photographic lens 1 and a lens encoder 2b (see FIG. 2) for generating position signals of the photographic lens 1; 3, a lens shutter; 4, a photometry sensor for an AE operation; 5, a lens for defining a light receiving angle of the photometry sensor 4; 6, a housing including a distance measuring sensor 6a (see FIG. 2) to be described later with respect to FIG. 5 and a finder (not shown); 7, a photoreflector for generating signals for indicating that one frame of a film F has been transported and also for determining a time to stop writing information to a magnetic memory portion of the film, in response to detecting perforations P1 and P2 of the film F, which will be described later; 8, a film transporting motor provided inside a spool; 9, a gear train for reducing the speed and also for changing over a winding operation and a rewinding operation of the film F; 10, a rewinding fork; C, a film cartridge receiving the film F in such a manner that the leader portion of the film F remains outside of the film cartridge C; F, the aforementioned film with a magnetic memory portion, i.e., a magnetic track T, located on the base side thereof; P1 and P2, the aforementioned perforations corresponding to a photographic frame A; H, a magnetic head for writing or reading information to or from the magnetic track T; 11, a pad for pressing the film F on the magnetic head H and having in the middle thereof a recess for improving the adherence between the film F and a head gap (not shown) of the magnetic head H; 12, a pad movement control mechanism for making the pad 11 press the film F against the magnetic head H under a specified pressure only during a film transporting operation; 16, a release button; SW1, a switch for activating the photometry operation and the distance measuring operation; SW2, a switch for starting the sequential operations for opening the shutter and transporting the film; and 22, a photoreflector generating signals for determining a writing frequency of the writing information operation of the writing information operation by the magnetic head H to the magnetic memory track T and for determining a time to start writing information to the magnetic memory track T.

Figure 2:
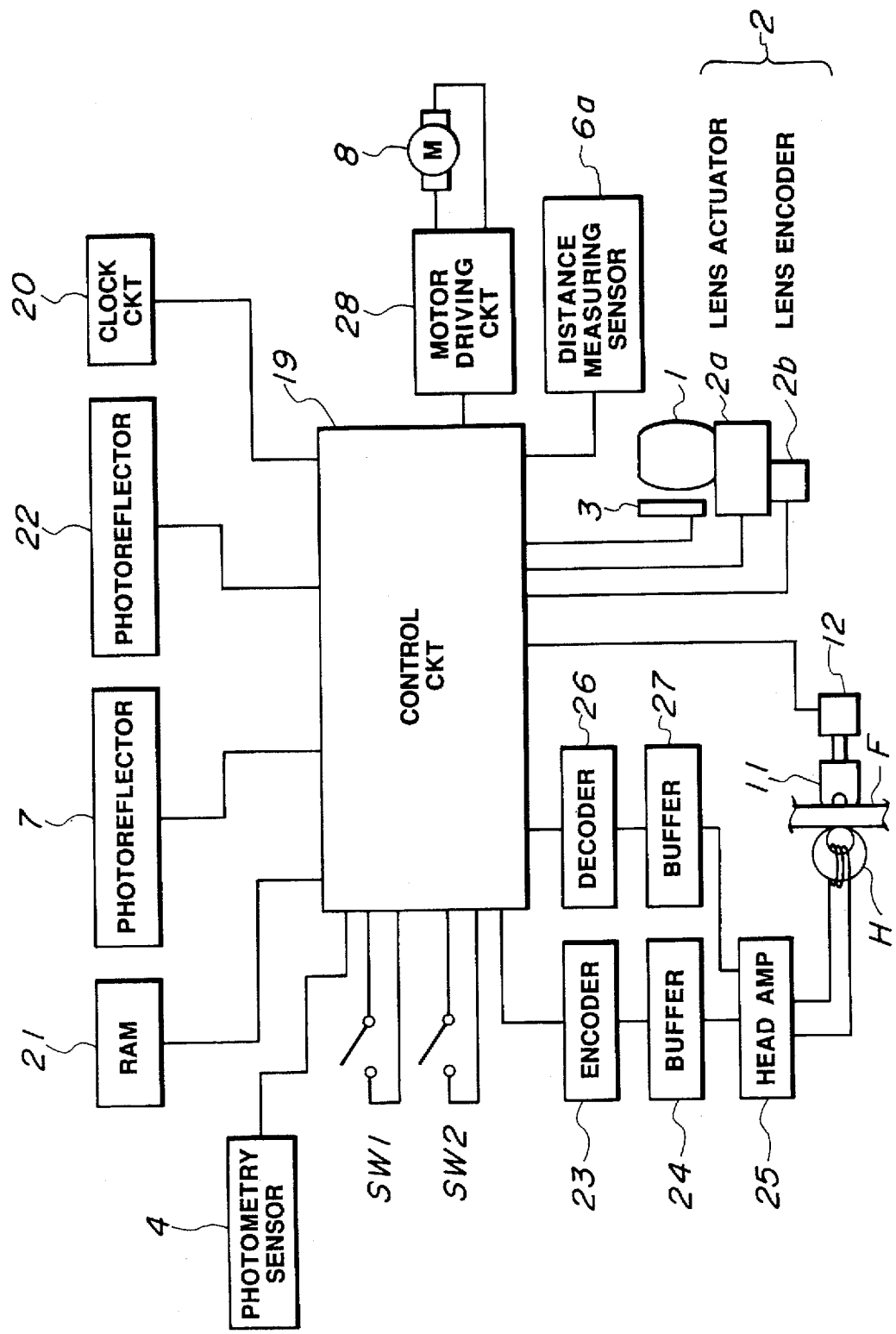
FIG. 2 is a circuit block diagram of the camera shown in FIG. 1.

FIG. 2 is a circuit block diagram of the camera. In FIG. 2, the identical parts or components as those shown in FIG. 1 are denoted by the same reference characters, and a description thereof is omitted.

Referring to FIG. 2, reference numeral 19 denotes a control circuit comprising a microcomputer for controlling individual operations of the camera; 20, a well-known clock circuit; 21, a RAM for storing photographic information at the time of a photographing operation, pertaining to a diaphragm, a shutter speed, etc.; 23, an encoder; 24, a buffer; 25, a head amplifier; 26, a decoder; 27, a buffer; and 28, a motor driving circuit for driving the film transporting motor 8.

Figure 3:
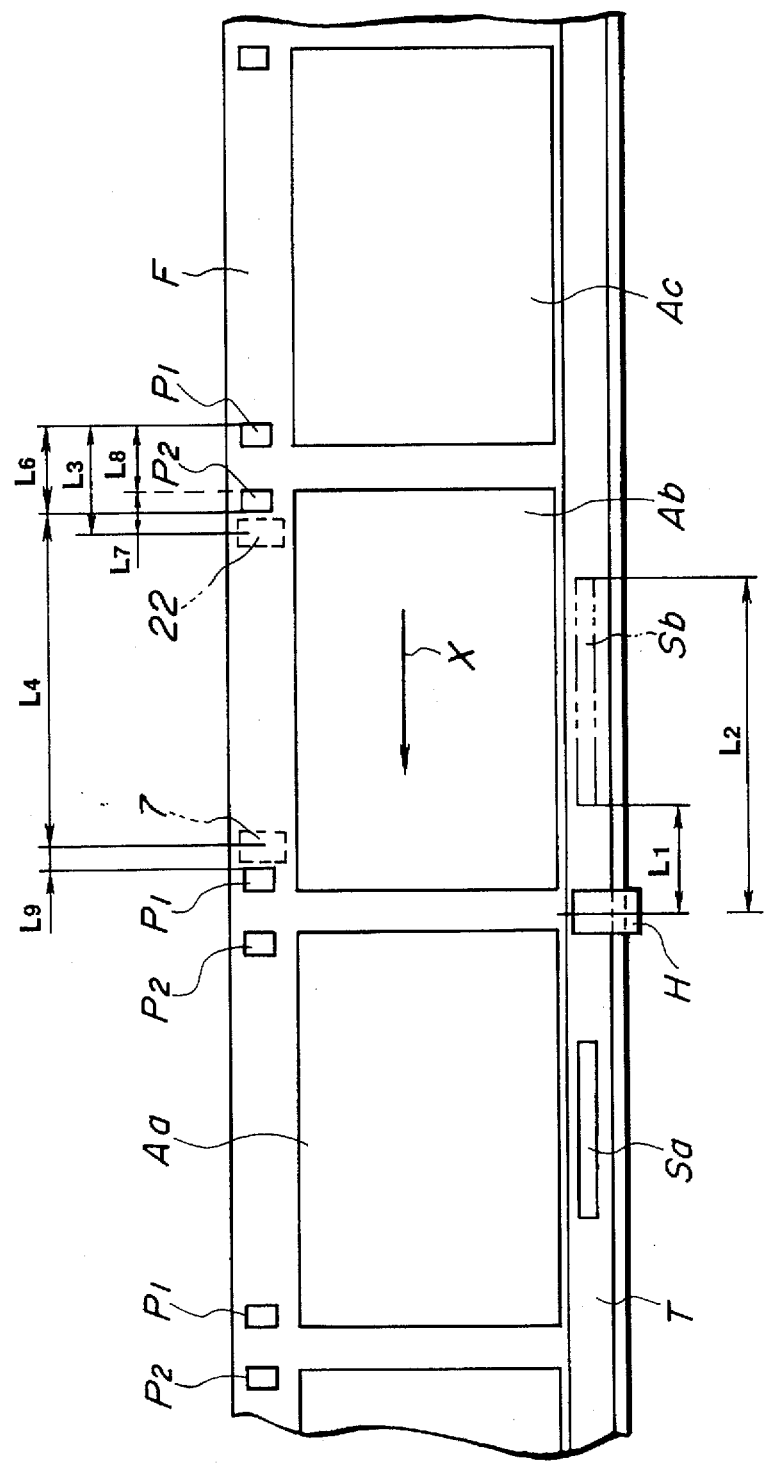
FIG. 3 is a front view showing a relationship between a photoreflector and several photographic frames of a film in accordance with the preferred embodiment.

FIG. 3 is a diagram showing a relationship between the photoreflector 7 and 22 and the film F.

In FIG. 3, reference character Aa denotes a photographic frame which has been already exposed; Ab, a photographic frame to be exposed next; Ac, a photographic frame that will be exposed after the photographic frame Ab. Reference character T denotes the aforementioned magnetic memory portion of the film, wherein the film information pertaining to the film speed, the kind of the film, etc., is repeatedly recorded in advance. Reference character Sa denotes an area where photographic information pertaining to a shutter speed, etc. or the date of a photographing operation, is written over the previously-recorded information by the magnetic head H when the exposed frame was wound up; Sb, an area where the information will be written over the previously-written information by the magnetic head H for frame Ab. Reference character X denotes an arrow showing the winding direction of the film F.

Figure 4:
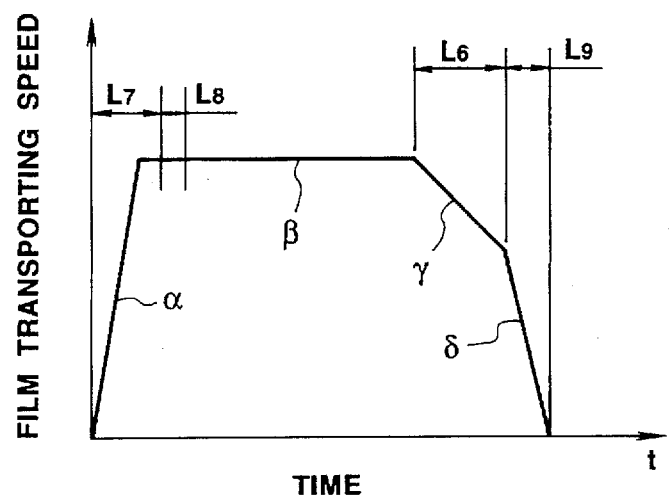
FIG. 4 is a diagram showing a relationship between film transporting speed and time in accordance with the preferred embodiment.

FIG. 4 is a diagram showing a relationship between a film transporting speed and time, which is shown corresponding to each distance L6, L7, L8, and L9 shown in the FIG. 3. FIG. 4 will be explained in detail in the following description of an operation of the above-mentioned camera.

The operation of the aforementioned camera will be described below with reference to the flowchart of FIG. 5 showing an operation of the control circuit 19.

[Step 201] It is determined whether an unillustrated back lid switch is on, indicating that the film cartridge C is set in the camera and also that the back lid is closed. If the back lid switch is on, the process goes to step 202.

[Step 202] The film transport motor 8 is driven by the motor driving circuit 28 to start winding film F (autoloading).

[Step 203] The film information pertaining to the film speed, the specified number of film frames, the kind of the film F, etc. which is previously-recorded in the magnetic memory portion T of the film F, is read out by the magnetic head H.

As shown in FIG. 2, this read-out film information is amplified and converted into digital data by the head amplifier 25, transferred to the buffer 27, decoded and transferred to the control circuit 19 by the decoder 26, and stored in the RAM 21.

[Step 204] The number of transported frames of the film is counted to determine whether the first frame to be photographed has reached the specified position, i.e., the aperture position. If the first frame reaches the specified position, the process goes to step 205.

[Step 205] The film transporting motor 8 is stopped to stop winding the film F.

[Step 206] It is determined whether the switch SW1 is on. If the switch SW1 is on, the process goes to step 207.

[Step 207] The photometry sensor 4 and the distance measuring sensor 6a are driven to obtain photometry and object distance measuring information.

[Step 208] It is determined whether the switch SW2 is on. If the switch SW2 is on, the process goes to step 209.

[Step 209] A well-known exposure operation is performed; that is, control circuit 19 takes in lens position signals through the lens actuator 2a from the lens encoder 2b and instructs the lens actuator 2a to stop when the photographic lens 1 reaches a position corresponding to the object distance data obtained in the step 207, i.e. the focusing operation is stopped. Subsequently, the lens shutter 3 is opened and closed for the time determined on the basis of the output from the photometry sensor 4 in the step 207.

At this time, the shutter speed and/or the aperture value is stored in the RAM 21.

Next, in this case, the photographic frame Aa, which is the first frame for photographing, is exposed.

However, for convenience of the following explanation, at this time, assuming that the photographic frame Ab is exposed, the following description will be continued.

[Step 210] The film transporting motor 8 is actuated through the motor driving circuit 28 to start winding up the photographic frame Ab, i.e., a one frame winding-up operation occurs, whereby the film F is transported in the direction of the arrow X.

[Step 211] It is determined whether the perforation P2, i.e. one of the perforations P1 and P2 formed corresponding to the photographic frame Ab, has passed the position where the photoreflector 22 (denoted as PR22 in FIG. 5) is located. If the perforation P2 has passed the position where the photoreflector 22 is located, the process goes to step 212. Otherwise, the process returns to step 211.

In other words, when the perforation P2 passes the photoreflector 22, that is, the film F is transported the distance L7 (see FIG. 3), after winding up of the film is started, a film winding-up speed is regarded as having become constant (see the curve α shown in FIG. 4), and the process goes to step 212.

[Step 212] A timer provided in the control circuit 19 is started.

[Step 213] It is determined whether the perforation P1, i.e. one of the perforations P1 and P2 formed corresponding to the photographic frame Ab, has passed the position where the photoreflector 22 is located. If the perforation P1 has passed the position where the photoreflector 22 is located, the process goes to step 214. Otherwise, the process returns to step 213.

[Step 214] The aforementioned timer in the control circuit 19 is stopped.

[Step 215] The writing frequency of the magnetic head H writing information to the magnetic memory portion of the film F is determined by the content of the aforementioned timer in the control circuit 19. The content of the timer is the interval from the time when the perforation P2 of the photographic frame Ab passes the photoreflector 22 to the time when the perforation P1 of the next photographic frame Ac reaches the photoreflector 22, which corresponds to the distance L8 shown in FIG. 3.

The frequency of the magnetic head H is made low when the film transporting speed is slow, and the frequency of the magnetic head H is made high when the film transporting speed is fast, whereby the number of bits for writing information to the magnetic memory portion for a unit distance is made constant.

[Step 216] The magnetic head H is driven to start writing the various kinds of data pertaining to the shutter speed, the aperture, etc. stored in the RAM 21 to the magnetic memory portion area Sb through the head amplifier 25. The position to start writing this information is determined on the basis of the distance (L7+L8), i.e. the distance L3, where L3=L1.

[Step 217] It is determined whether the perforation P2 has passed the position where the photoreflector 7 (denoted as PR7 in FIG. 5) is located. If the perforation P2 has not passed the photoreflector 7, the process returns to the step 216 to continue writing the information to the magnetic memory portion Sb of the film F. If the perforation P2 has passed the photoreflector 7, the process goes to step 218.

[Step 218] Driving of the magnetic head is stopped immediately to terminate writing the information to the magnetic memory portion Sb of the film F. Thus, in FIG. 3, L4=L2. As a result, the information is precisely written in the magnetic memory portion Sb (not shifted into other photographic frames), and the original previously-written information is retained except the magnetic memory portion Sb, where it is written over by information. Therefore, it is possible to distinguish between an exposed frame and an unexposed frame when the film F is loaded in the camera again after the film cartridge C has once been taken out.

On the other hand, at the same time of stopping the driving of the magnetic head H, the electric supply to the film transporting motor 8 is changed by means of the motor driving circuit 28. That is, in order to prepare to stop transporting the film, the film transporting speed is reduced by varying a duty cycle or lowering a voltage (an area γ shown in the FIG. 4).

[Step 219] It is determined whether the perforation P1 has passed the position where the photoreflector 7 (denoted PR7 in FIG. 5) is located. If the perforation P1 has passed the photoreflector 7, the process goes to step 220.

[Step 220] The driving of the film transporting motor 8 through the motor driving circuit 28 is stopped to terminate winding of the film F. At this time, winding the film F is not terminated at once, and the film F is transported a little, i.e. an area δ shown in FIG. 4. This distance is L9. As a result, the photographic frame Ac reaches the aperture position.

[Step 221] It is determined whether no unexposed frame of the film F is left on the basis of the specified an unexposed frame is left, the process returns to the step 206 in order to prepare for the next exposure operation. If no unexposed frame is left, the process goes to step 222.

[Step 222] The film transporting motor 8 is driven in the opposite direction of the aforementioned direction through the motor driving circuit 28 to rewind the film F.

The process is thereby completed.

Although not described above, the pad 11 is arranged to be pressed against the magnetic head H through the pad movement control mechanism 12 only during the time of transporting the film F, to ensure reading or writing magnetic information from or to the magnetic memory portion Sb of the film F.

According to the present embodiment, by using the output of the photoreflector 22, the writing frequency and the starting time for writing information by the magnetic head H to the magnetic memory portion Sb of the film F is determined, and by using the output of the photoreflector 7, the stopping time for stopping the writing of information by the magnetic head H to the magnetic memory portion Sb of the film F is determined and stopping of the film one-frame transporting operation is controlled. Therefore, the signal generating device for controlling the writing of information to the magnetic memory portion of the film F and the stopping of the film transporting operation, is prevented from harming the film F or acting incorrectly.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera comprising:
    a first detection unit which detects perforations of a film, arranged at a first position where the perforations of the film pass;
    a second detection unit which detects the perforations of the film, arranged at a second position where the perforations of the film pass, said second detection unit being shifted from the first position in a direction in which the film is transported; and
    a determination device which determines an information writing frequency for writing information to the film in accordance with a detection result of said first detection unit without using a detection result of said second detection unit, and controls a movement of the film in accordance with the detection result of said second detection unit.

2. A camera according to claim 1, wherein said first detection unit comprises an optical sensor.

3. A camera according to claim 2, wherein said second detection unit comprises an optical sensor.

4. A camera according to claim 1, wherein said second detection unit comprises an optical sensor.

5. A camera according to claim 1, wherein said determination device comprises means for controlling a start of writing information to the film in accordance with a detection result of said first detection unit.

6. A camera according to claim 5, wherein said determination device comprises means for controlling a stop of writing the information to the film in accordance with a detection result of said second detection unit.

7. A camera according to claim 1, wherein said determination device comprises means for controlling a stop of writing information to the film in accordance with a detection result of said second detection unit.

8. A camera according to claim 1, further comprising:
a magnetic recording device operated in accordance with the information writing frequency determined by said determination device.

9. A camera according to claim 8, further comprising:
a film transporting device controlled by said determination device.

10. A camera according to claim 1, further comprising:
a film transporting device controlled by said determination device.

11. A control apparatus for a camera using a film with a magnetic memory portion, comprising:
a first detection unit which detects a perforation of a film, arranged at a first position where the perforation of the film passes;
a second detection unit which detects the perforation of the film, arranged at a second position where the perforation of the film passes, said second detection unit being shifted from the first position in a direction in which the film is transported; and
a determination device which determines an information writing frequency for writing information to the film in accordance with a detection result of said first detection unit without using a detection result of said second detection unit, and controls a movement of the film in accordance with the detection result of said second detection unit.

12. An apparatus according to claim 11, wherein said first detection unit comprises an optical sensor.

13. An Apparatus according to claim 12, wherein said second detection unit comprises an optical sensor.

14. An Apparatus according to claim 11, wherein said second detection unit comprises an optical sensor.

15. An apparatus according to claim 11, wherein said determination device comprises means for controlling a start of writing information to the film in accordance with a detection result of said first detection unit.

16. An apparatus according to claim 15, wherein said determination device comprises means for controlling a stop of writing the information to the film in accordance with a detection result of said second detection unit.

17. An apparatus according to claim 11, wherein said determination device comprises means for controlling a stop of writing information to the film in accordance with a detection result of said second detection unit.

18. An apparatus according to claim 11, further comprising:
a magnetic recording device operated in accordance with the information writing frequency determined by said determination device.

19. An apparatus according to claim 18, further comprising:
a film transporting device controlled by said determination device.

20. An apparatus according to claim 11, further comprising:
a film transporting device controlled by said determination device.

21. A camera comprising:
a first detection unit which detects a movement of perforations formed in an image recording medium;
a second detection unit which detects the movement of the perforations, wherein said second detection unit detects the movement of the perforations at a different position than the position where said first detection unit detects the movement of the perforations; and
a determination device which determines a movement speed of the image recording medium in accordance with a detection result of said first detection unit without using a detection result of said second detection unit, and controls a movement of the image recording medium in accordance with the detection result of said second detection unit.

22. A camera according to claim 21, wherein said determination device comprises means for stopping the movement of the image recording medium in accordance with a detection result of said second detection unit.

23. A camera according to claim 21, wherein said second detection unit is arranged to detect the movement of the perforation at a shifted position in a direction along which the perforation moves from a position where said first detection unit detects the perforation.

24. A camera according to claim 21, wherein the image recording medium comprises a film.

25. A camera according to claim 21, further comprising:
a recording unit which records information on the image recording medium.

26. A camera according to claim 25, wherein the image recording medium comprises a film.

27. A camera according to claim 25, wherein the image recording medium comprises a film with a magnetic memory portion.

28. A camera according to claim 25, wherein said determination device comprises means for determining an information recording frequency of said recording unit in accordance with the detected movement speed of the image recording medium.

29. A camera according to claim 25, wherein said determination device comprises means for controlling a start of an information recording operation of said recording unit.

30. A camera according to claim 29, wherein said determination device comprises means for controlling a stop of the information recording operation of said recording unit.

31. A camera according to claim 25, wherein said determination device comprises means for controlling a stop of an information recording operation of said recording unit.

32. A camera according to claim 25, wherein said determination device comprises means for controlling an information recording operation of said recording unit in accordance with the detected movement speed of the image recording medium.

33. An apparatus comprising:
a first detection unit which detects a movement of perforations formed in an image recording medium;
a second detection unit which detects the movement of the perforations, wherein said second detection unit detects the movement of the perforations at a different position than the position which said first detection unit detects the movement of the perforations; and
a determination device which determines a movement speed of the image recording medium in accordance with a detection result of said first detection unit without using a detection result of said second detection unit, and controls a movement of the image recording medium in accordance with the detection result of said second detection unit.

34. An apparatus according to claim 33, wherein said determination device comprises means for stopping the movement of the image recording medium in accordance with a detection result of said second detection unit.

35. An apparatus according to claim 33, wherein said second detection unit is arranged to detect the movement of the perforation at a shifted position in a direction along which the perforation moves from a position where said first detection unit detects the perforation.

36. An apparatus according to claim 33, wherein the image recording medium comprises a film.

37. An apparatus according to claim 33, further comprising:

a recording unit which records information on the image recording medium.

38. An apparatus according to claim 37, wherein the image recording medium comprises a film.

39. An apparatus according to claim 37, wherein the image recording medium comprises a film with a magnetic memory portion.

40. An apparatus according to claim 37, wherein said determination device comprises means for determining an information recording frequency of said recording unit in accordance with the detected movement speed of the image recording medium.

41. An apparatus according to claim 40, wherein said determination device further comprises means for controlling an information recording operation at the time when said recording unit records the information on the memory portion of the image recording medium.

42. An apparatus according to claim 40, wherein said determination device comprises means for controlling a start of an information recording operation of said recording unit.

43. An apparatus according to claim 42, wherein said determination device comprises means for controlling a stop of the information recording operation of said recording unit.

44. An apparatus according to claim 40, wherein said determination device comprises means for controlling a stop of an information recording operation of said recording unit.

45. An apparatus according to claim 40, wherein said determination device further comprises means for stopping the movement of the image recording medium.

46. An apparatus according to claim 37, wherein said determination device further comprises means for controlling an information recording operation at a time when said recording unit records the information on the memory portion of the image recording medium.

47. An apparatus according to claim 37, wherein said determination device further comprises means for starting an information recording operation at a time when said recording unit records the information on the memory portion of the image recording medium.

48. An apparatus according to claim 47, wherein said determination device further comprises means for stopping the information recording operation at the time when said recording unit records the information on the memory portion of the image recording medium.

49. An apparatus according to claim 37, wherein said determination device further comprises means for stopping an information recording operation at a time when said recording unit records the information on the memory portion of the image recording medium.

50. An apparatus according to claim 37, wherein said determination device comprises:

means for determining an information recording frequency of said recording unit in accordance with the detected movement speed of the image recording medium; and means for controlling the movement of the image recording medium in response to a detection result of said second detection means.

51. An apparatus according to claim 50, wherein said determination device further comprises means for controlling, in response to said first and second detection units, an information recording operation at the time when said recording unit records the information on the memory portion of the image recording medium.

52. An apparatus according to claim 50, wherein said determination device further comprises means for starting, in response to a detection result of said first detection unit, an information recording operation at the time when said recording unit records the information on the memory portion of the image recording medium.

53. An apparatus according to claim 52, wherein said determination device further comprises means for stopping, in response to said second detection unit, an information recording operation at the time when said recording unit records the information on the memory portion of the image recording medium.

54. An apparatus according to claim 50, wherein said determination device further comprises means for stopping, in response to said second detection units, an information recording operation at the time when said recording unit records the information on the memory portion of the image recording medium.

55. An apparatus according to claim 37, wherein said determination device comprises:

means for determining, in response to a detection result of said first detection unit, an information recording frequency of said recording unit in accordance with the detected movement speed of the image recording medium; and means for stopping the movement of the image recording medium in response to a detection result of said second detection unit.

56. An apparatus according to claim 37, wherein said determination device comprises:

means for determining, in response to a detection result of said first detection unit, an information recording frequency of said recording unit in accordance with the detected movement speed of the image recording medium; and means for controlling, in response to said first and second detection units, an information recording operation at the time when said recording unit records the information on the memory portion of the image recording medium.

57. An apparatus according to claim 37, wherein said determination device further comprises:

means for determining, in response to a detection result of said first detection unit, an information recording frequency of said recording unit in accordance with the detected movement speed of the image recording medium; and means for starting, in response to a detection result of said first detection unit, an information recording operation at the time when said recording unit records the information on the memory portion of the image recording medium.

58. An apparatus according to claim 57, wherein said determination device further comprises means for stopping, in response to said second detection unit, an information recording operation at the time when said recording unit records the information on the memory portion of the image recording medium.

59. An apparatus according to claim 37, wherein said determination device comprises:

means for determining an information recording frequency of said recording unit for recording information on the memory portion of the image recording medium in accordance with the detected movement speed of the image recording medium; and means for stopping, in response to a detection result of said second detection unit, an information recording operation at the time when said recording unit records the information on the memory portion of the image recording medium.

60. An apparatus according to claim 37, wherein said determination device comprises:

means for controlling the movement of the image recording medium in response to a detection result of said second detection means; and means for controlling, in response to said first and second detection units, an information recording operation of said recording unit at a time when said recording unit records the information on the memory portion of the image recording medium.

61. An apparatus according to claim 37, wherein said determination device comprises:

means for controlling the movement of the image recording medium in response to a detection result of said second detection unit; and means for starting, in response to a detection result of said first detection unit, an information recording operation of said recording unit at the time when said recording unit records the information on the memory portion of the image recording medium.

62. An apparatus according to claim 61, wherein said determination device comprises means for stopping, in response to a detection result of said second detection unit, the information recording operation of said recording unit at the time when said recording unit records the information on the memory portion of the image recording medium.

63. An apparatus according to claim 37, wherein said determination device comprises:

means for controlling the movement of the image recording medium in response to a detection result of said second detection unit; and means for stopping, in response to a detection result of said second detection unit, an information recording of said recording unit operation at the time when said recording unit records the information on the memory portion of the image recording medium.

64. An apparatus according to claim 37, wherein said determination device comprises means for controlling, in response to said first and second detection units, an information recording operation of said recording unit at a time when said recording unit records the information on the memory portion of the image recording medium.

65. An apparatus according to claim 37, wherein said determination device comprises:

means for starting, in response to a detection result of said first detection unit, an information recording operation of said recording unit on the memory portion of the image recording medium; and means for stopping, in response to a detection result of said second detection unit, the information recording operation of said recording unit at the time when said recording unit records the information on the memory portion of the image recording medium.

66. A camera comprising:

a first detection unit which detects a movement of perforations formed in an image recording medium;

a second detection unit which detects the movement of the perforations, said second detection unit detecting the movement of the perforations at a different position than said first detection unit detects the movement of the perforations; and a control device which controls a start of recording information on the image recording medium in accordance with a detection result of said first detection unit without using a detection result of said second detection unit, and controls a movement of the image recording medium in accordance with the detection result of said second detection unit.

67. A camera according to claim 66, wherein said control device comprises means for stopping the movement of the image recording medium in accordance with a detection result of said second detection unit.

68. A camera according to claim 66, wherein said second detection unit is arranged to detect the movement of the perforation at a position shifted in a direction along which the perforation moves from a position where said first detection unit detects the perforation.

69. A camera according to claim 66, wherein the image recording medium comprises a film.

70. A camera according to claim 66, further comprising:

a recording unit which records information on the image recording medium.

71. A camera according to claim 70, wherein the image recording medium comprises a film.

72. A camera according to claim 70, wherein the image recording medium comprises a film with a magnetic memory portion.

73. A camera according to claim 70, wherein said control device comprises means for determining an information recording frequency of said recording unit in accordance with the detected movement speed of the image recording medium.

74. A camera according to claim 70, wherein said control device comprises means for controlling a start of an information recording operation of said recording unit.

75. A camera according to claim 74, wherein said control device comprises means for controlling a stop of the information recording operation of said recording unit.

76. A camera according to claim 70, wherein said control device comprises means for controlling a stop of an information recording operation of said recording unit.

77. An apparatus comprising:

a first detection unit which detects a movement of perforations formed in an image recording medium;

a second detection unit which detects the movement of the perforations, said second detection unit detecting the movement of the perforations at a different position than said first detection unit detects the movement of the perforations; and a control device which controls a start of recording information on the image recording medium in accordance with a detection result of said first detection unit without using a detection result of said second detection unit, and controls a movement of the image recording medium in accordance with the detection result of said second detection unit.

78. An apparatus according to claim 66, wherein said control device comprises means for stopping the movement of the image recording medium in accordance with a detection result of said second detection unit.

79. An apparatus according to claim 66, wherein said second detection unit is arranged to detect the movement of the perforation at a position shifted in a direction along which the perforation moves from a position where said first detection unit detects the perforation.

80. An apparatus according to claim 66, wherein the image recording medium comprises a film.

81. An apparatus according to claim 66, further comprising:

a recording unit which records information on the image recording medium.

82. An apparatus according to claim 70, wherein the image recording medium comprises a film.

83. An apparatus according to claim 70, wherein the image recording medium comprises a film with a magnetic memory portion.

84. An apparatus according to claim 70, wherein said control device comprises means for determining an information recording frequency of said recording unit in accordance with the detected movement speed of the image recording medium.

85. An apparatus according to claim 70, wherein said control device comprises means for controlling a start of an information recording operation of said recording unit.

86. An apparatus according to claim 74, wherein said control device comprises means for controlling a stop of the information recording operation of said recording unit.

87. An apparatus according to claim 70, wherein said control device comprises means for controlling a stop of an information recording operation of said recording unit.

* * * * *

UNITED STATES PATENT AND TRADEMARK OFFICE
CERTIFICATE OF CORRECTION

PATENT NO. : 5,724,623
DATED : March 3, 1998
INVENTOR(S) : HIDEO TAMAMURA

It is certified that error appears in the above-identified patent and that said Letters Patent is hereby corrected as shown below:

COLUMN 2
    Line 13, "time" should read --time for--.

COLUMN 5
    Line 64, "specified" should read --specified number of film frames read out in the step 203. If--.

COLUMN 6
    Line 25, "Drawings" should read --drawings--.

COLUMN 7
    Line 35, "Apparatus" should read --apparatus--.
    Line 37, "Apparatus" should read --apparatus--.

COLUMN 10
    Line 23, "units" should read --unit--.

UNITED STATES PATENT AND TRADEMARK OFFICE
CERTIFICATE OF CORRECTION

PATENT NO. : 5,724,623
DATED : March 3, 1998
INVENTOR(S) : HIDEO TAMAMURA

It is certified that error appears in the above-identified patent and that said Letters Patent is hereby corrected as shown below:

COLUMN 11
    Line 46, "recording" should read --recording operation--.
    Line 47, "operation" should be deleted.

Signed and Sealed this

First Day of September, 1998

Attest:

BRUCE LEHMAN

Attesting Officer

Commissioner of Patents and Trademarks